United States Patent
Palberg et al.

(10) Patent No.: US 10,968,082 B2
(45) Date of Patent: Apr. 6, 2021

(54) CRANE, CONSTRUCTION MACHINE OR INDUSTRIAL TRUCK SIMULATOR

(71) Applicant: Liebherr-Components Biberach GmbH, Biberach an der Riß (DE)

(72) Inventors: Michael Palberg, Riedlingen (DE); Jürgen Resch, Begernau (DE); Sven Brandt, Munich (DE); Thomas Steib, Ummendorf (DE)

(73) Assignee: Liebherr-Components Biberach GmbH, Biberach an der Riß (DE)

( * ) Notice: Subject to any disclaimer, the term of this patent is extended or adjusted under 35 U.S.C. 154(b) by 172 days.

(21) Appl. No.: 16/069,384

(22) PCT Filed: Jan. 10, 2017

(86) PCT No.: PCT/EP2017/000024
§ 371 (c)(1),
(2) Date: Jul. 11, 2018

(87) PCT Pub. No.: WO2017/121636
PCT Pub. Date: Jul. 20, 2017

(65) Prior Publication Data
US 2019/0019429 A1   Jan. 17, 2019

(30) Foreign Application Priority Data
Jan. 14, 2016   (DE) .................. 10 2016 000 353

(51) Int. Cl.
*B66C 13/40*      (2006.01)
*B66C 13/54*      (2006.01)
(Continued)

(52) U.S. Cl.
CPC ............. *B66C 13/40* (2013.01); *B66C 13/46* (2013.01); *B66C 13/54* (2013.01); *E02F 9/166* (2013.01);
(Continued)

(58) Field of Classification Search
CPC .......... G09B 9/04; G09B 9/042; G09B 9/048; G09B 9/05
See application file for complete search history.

(56) References Cited

U.S. PATENT DOCUMENTS 8,195,368 B1 *   6/2012   Leban ................... B66C 13/063
                                                              701/50
10,162,797 B1 *  12/2018   Culver ...................... G09B 9/02
(Continued)

FOREIGN PATENT DOCUMENTS

CN   103794103 A   5/2014
DE   102006044086 A1   4/2008
(Continued)

OTHER PUBLICATIONS

"Ship-to-Shore Crane Simulator | STS Crane Simulator" published by vortexsim on YouTube on or before Aug. 26, 2013; printed and accessed from URL <https://www.youtube.com/watch?v=VnBXbPFUNRs>, 10 pages.*
(Continued)

*Primary Examiner* — Jason T Yen
(74) *Attorney, Agent, or Firm* — Troutman Pepper Hamilton Sanders LLP; Ryan A. Schneider (57) ABSTRACT

A crane, a construction machine or an industrial truck, with a control station including at least one input means for inputting control commands, a graphical simulation module for calculating a virtual representation of the machine surroundings and/or machine components visible from the control station, such as a boom or a load hook, and a display device for displaying the calculated virtual representation, wherein a movement simulation module is provided for determining movements and/or deformations of the machine components according to the inputted control commands, depending on which the graphical simulation module calculates the virtual representation. Proposed is a data emu-
(Continued)

lation using hardware components, which carry out actual actuating movements and thus simulate "actual" actuating movements of the machine to be simulated, in order to provide corresponding movement data more rapidly and with less computing performance, whereby a more realistic simulation can be achieved in real-time or almost real-time.

20 Claims, 3 Drawing Sheets

(51) Int. Cl.
    *E02F 9/16*     (2006.01)
    *E02F 9/20*     (2006.01)
    *E02F 9/26*     (2006.01)
    *B66C 13/46*     (2006.01)
    *G09B 9/05*     (2006.01)
    *G09B 9/16*     (2006.01)

(52) U.S. Cl.
    CPC ............ *E02F 9/2004* (2013.01); *E02F 9/205* (2013.01); *E02F 9/264* (2013.01); *G09B 9/05* (2013.01); *G09B 9/165* (2013.01)

(56) References Cited

U.S. PATENT DOCUMENTS

| | | | | |
|---|---|---|---|---|
| 10,410,124 | B1* | 9/2019 | Zhou | G06N 5/04 |
| 2003/0224333 | A1* | 12/2003 | Vastvedt | G09B 9/165 |
| | | | | 434/29 |
| 2006/0040239 | A1* | 2/2006 | Cummins | G09B 9/05 |
| | | | | 434/62 |
| 2009/0162814 | A1* | 6/2009 | Swan | G09B 9/04 |
| | | | | 434/69 |
| 2009/0182537 | A1* | 7/2009 | Kang | G09B 9/05 |
| | | | | 703/2 |
| 2012/0154572 | A1* | 6/2012 | Stratton | G09B 9/048 |
| | | | | 348/114 |
| 2013/0004920 | A1* | 1/2013 | Pabst | G09B 9/05 |
| | | | | 434/69 |
| 2013/0245815 | A1* | 9/2013 | Schneider | B66D 1/525 |
| | | | | 700/228 |
| 2014/0290400 | A1* | 10/2014 | Choi | G09B 9/02 |
| | | | | 74/43 |
| 2014/0297136 | A1* | 10/2014 | Miyoshi | B66C 13/18 |
| | | | | 701/50 |
| 2015/0310758 | A1* | 10/2015 | Daddona | G09B 9/02 |
| | | | | 434/62 |
| 2016/0035251 | A1* | 2/2016 | Delplace | G09B 19/003 |
| | | | | 434/66 |

FOREIGN PATENT DOCUMENTS

| | | |
|---|---|---|
| DE | 102009045452 A1 | 4/2011 |
| DE | 102010016113 A1 | 9/2011 |
| DE | 102013011818 A1 | 1/2015 |
| EP | 2280359 A1 | 2/2011 |

OTHER PUBLICATIONS

Langen, I., et al. Simulation of Dynamic Behaviour of a FPSO Crane, Stavanger University College, 2003, 17 pages.*
International Search Report and Written Opinion for International Patent Application No. PCT/EP2017/000024 dated Mar. 22, 2017.
German Search Report for German Patent Application No. 10 2016 000 353.7 dated Jan. 14, 2016.
Langen, I. et al., "Simulation of Dynamic Behaviour of a FPS" Crane, Stavanger University College, 2003.

* cited by examiner

CRANE, CONSTRUCTION MACHINE OR INDUSTRIAL TRUCK SIMULATOR

CROSS-REFERENCE TO RELATED APPLICATIONS

This is a § 371 national stage of International Application PCT/EP2017/000024, with an international filing date of 10 Jan. 2017, which claims the benefit of DE Patent Application Serial No. 10 2016 000 353.7, filed on 14 Jan. 2016, the benefit of the earlier filing date of which is hereby claimed under 35 USC § 119(a)-(d) and (f). The entire contents and substance of all applications are hereby incorporated by reference.

BACKGROUND OF THE INVENTION

1. Field of the Invention

The present invention relates generally to simulator for a crane, a construction machine or an industrial truck, with a control station having at least one input means for inputting control commands, a graphical simulation module for computing a virtual representation of the machine surroundings and/or machine components such as a boom or load hook visible from the control station, as well as a display device for displaying the computed virtual representation, wherein the movement simulation module is provided to determine movements and/or deformations of the machine components depending on the input control commands, depending on which the graphical simulation module computes the virtual representation.

2. Description of Related Art

Cranes and similar large devices such as pile drivers, surface miners or cable excavators are very complex in operation and control, and thus difficult to learn, so that common training materials such as photos, plans or even films are not sufficient to actually teach the operation and monitoring in a demonstrative manner and to make it easily understandable. Here, not only the large number of control functions and their interplay as well as the involved input means, which are quite complex in their entirety, such as joysticks, foot pedals and control switches, are a problem, but also the unusual, machine-specific reactions of the machine structure to the movements of the actuators. Cranes such as tower slewing cranes or telescopic luffing cranes, but also dock-side cranes or maritime cranes have large, slender structural components such as booms or jobs or tower structures, which can twist and are relatively soft, so that structural deformations and oscillating or swinging movements go hand in hand with acceleration and deceleration processes of the actuators, which complicate safe operation even for experienced crane operators when they change to a new type of crane. In contrast to small devices with structures that are assumed to be approximately rigid, there may be deformations of the tower structure or of the boom system for example in tower slewing cranes when a load is picked-up, or the load can swing back when rotating the load about the upright axis and the boom may follow this swing accordingly. Similar things can happen in cable excavators or pile drivers, so that the crane operator or machine operator becomes uncertain when they put into practice the control processes learned in theory, and learn the corresponding crane reactions.

In order to have a more realistic training situation, the use of crane simulators was proposed, in which the crane operator to be trained can enter control commands in an almost realistic control station, which may correspond to the crane operator's cab of a corresponding crane type, through input means provided there, such as joysticks, pedals, control switches or touchscreens, in order to learn the crane reactions to these control commands in a most realistic manner. To that end, a virtual representation of the crane surroundings as well as the crane components visible from the control station such as the boom and load hook are represented on a display device, which may include multiple monitors in a manner known per se, which are arranged in the field of view of the control station, wherein the virtual representation of the crane surroundings and the crane components is computed by a graphical simulation module depending on the input control commands.

If, for example, the crane is turned about the vertical axis, or a corresponding control command is input, the graphical simulation module computes the representation of the crane surroundings in such a way that this representation moves, on the screen, from right to left, or vice versa, so that the virtual crane surroundings displayed on the display device move past the crane operator in a manner similar to the "real" rotation of a crane in the crane cab thereof. If, on the other hand, a control command is input that lowers the load hook and/or pivots the boom downward, the graphical simulation module changes the virtual representation in such a way that the crane hook moves downward on the display device and the boom is pivoted downward, respectively. Through such a realistic simulation of crane operations, the crane operator easily gets a feeling for what the reactions to the actuations of the input means of the control station might be.

Such a crane simulator is known from patent document DE 10 2013 011 818 A1, for example. In this document, a crane operator's cab is provided as a control station having corresponding input means, wherein the inspection windows or the window panes of the simulated crane operator's cab are replaced by screens, on which the virtual representation of the crane surroundings is displayed. Through a technical simulation module, also the dynamic behavior of the control and drive components is to be simulated and considered for the screen representation, wherein in this case, mainly the actuations of crane components, e.g. of the lifting unit, occurring in certain crane movements, are represented.

However, being close to reality is still limited in the above mentioned crane simulator. On the one hand, a delayed response or a representation of the virtual reality which is delayed compared to the actual crane reactions occurring in real time may occur due to the complex computation processes required for the dynamic behavior, in particular if multiple actuations are to be employed virtually at the same time. On the other hand, the intuitive feeling for the crane reactions to certain control commands is limited due to the representations of the virtual crane surroundings that can be generated on the screens.

Against this background, the object underlying the present invention is to provide an improved simulator of the type described above, which prevents disadvantages of the prior art and further develops the the prior art in an advantageous manner. In particular, a more realistic simulation of the crane or machine operation is to be achieved, which improves the training effect and teaches the actual crane or machine behavior in a better way and makes it easier to learn.

SUMMARY OF THE INVENTION

According to the invention, this object is achieved by a simulator for a crane, a construction machine or an industrial truck, with a control station comprising at least one input means for inputting control commands, a graphical simulation module for calculating a virtual representation of the machine environment and/or machine components visible from the control station, as well as a display device for displaying the calculated virtual representation, wherein a movement simulation module for determining movements and/or deformations of machine components such as the crane jib or the load hook depending on the entered control commands is provided, and the graphical simulation module is configured for calculating the virtual representation depending on the determined movements and/or deformations, characterized in that the movement simulation module includes a data emulation apparatus for emulating movement data of the machine to be simulated, wherein the mentioned data emulation apparatus includes at least one actuator component for performing an actuator movement depending on a control command entered at the control station and the graphical simulation device is configured to generate the virtual representation under consideration of the performed actuator movement.

Thus, a data emulation using hardware components is proposed, which perform actual actuations and thus simulate "real" actuations of the machine to be simulated, in order to provide corresponding movement data more rapidly and with less computing power, whereby a more realistic simulation can be achieved in real-time or almost real-time. Here, the simulator cannot have the movement parameters required for the movement simulation computed by a simulation computer, but at least partially determine by way of data emulation using actually moving hardware components, which may be a part of the simulator. Such a data emulation module of the simulator can in particular include actuator components and/or power electronics components, by means of which actuations are actually performed, which simulate the real crane or machine movements, and these movements provide characterizing data, for example in the form of sensor signals, which represent the actuations of the mentioned drive components. Due to such a data emulation, movement and/or position parameters, which can be further employed for the movement simulation, can be provided significantly faster and with less computing power, which permits a more realistic simulation in real time or almost real time.

In order to achieve a particularly fast, realistic determination of movements of the machine components depending on the control commands input at the control station, according to a further aspect, the mentioned movement simulation module can be formed as a hybrid device or hybrid module, which, on the one hand, includes a computer for the simulation of movement and/or position parameters, and on the other, hardware components such as drive units, rotary encoders or frequency converters, which are at least simulator to the real crane or machine actuators, and by means of which actuations are simulated and movement and/or position parameters are determined. In particular, "real" hardware components are used, which are also mounted as actuators and/or control device components in the crane to be simulated or the machine to be simulated.

In particular, the movement simulation module may include the control cabinet or at least a part of the control cabinet or the components thereof, which is also used in the machine to be simulated and forms part of the machine control. In particular, power electronics and/or at least part of the power electronics such as a frequency converted can be used to simulate the actuations triggered by control command input at the control station.

Furthermore, in a further development of the invention, actuator units, for example in the form of servo motors, can be used, which serve for the emulation of the actuations of the machine or the machine components to be simulated. Advantageously, one drive unit in the form of a servo drive unit, which—in particular via the above mentioned frequency converter—is controlled in accordance with a control command, is used for a respective actuator axis, and further advantageously, can be coupled with a further drive unit, for example in the form of a servo drive unit, by means of which a counter moment and/or a counter load can be exerted in order to simulate actually occurring loads, resistances or inertia. For example, a load that counteracts a lifting mechanism can be simulated by means of the mentioned second drive unit, or a wind moment can be simulated, which counteracts a drive or a rotary mechanism.

The actuation of the first-mentioned drive unit which is performed, as the case may be, in consideration of the applied counter moment or the applied counter load, can be detected by a suitable detection device, wherein a corresponding detection signal represents the actually achieved actuation and can be used as a sensor signal in the further simulation, in particular in order to determine movements and/or positions and/or deformations of the structural parts in the above-mentioned manner and/or to simulate the virtual representation of the machine surroundings and/or the machine components visible therein.

Advantageously, multiple such drive units or multiple such drive unit pairs including drive and counter load drive as well as in each case one assigned detection device are used in order to be able to determine the different actuator axis and the actuations of the machine operation to be simulated performed in this regard.

Thus, according to a further aspect, sensor values of the drive units of the actuation axes, which are actuated and moved depending on the control commands input at the control station are not simulated or computed by means of a computation model, but instead are emulated or simulated by hardware components, which are most similar to the real actuator components of the machine to be simulated, and output as actual sensor values.

By such a data emulation system, the movement simulation module can determine movements and/or positions of the machine components much more faster and with less computing power, so that the virtual representation of the machine surroundings and/or of the machine components and also the involved actuations of the machine station can be achieved very much faster and realistic. In addition, the generated sensor signals can be displayed at the control station and/or be used for further monitoring measures such as bearing load monitoring or restriction of working areas, which can be displayed and/or simulated at the control station.

In the case that the crane simulator is used to simulate a tower slewing crane and the operation thereof, the above-mentioned drive unit pairs for performing the corresponding actuations and provision of the corresponding counter moment or counter load may correspond to the tower slewing crane—or in a top rotator the rotary mechanism of the boom, the lifting unit and the trolley drive.

According to a further aspect, the movement simulation module is configured in such a way that the crane or machine structure is not considered to be a rigid, so to say un-endlessly rigid structure, but as an elastically deformable and/or resilient and/or relatively soft structure, which—in addition to the actuation axis of the machine such as the boom pivot axis or the tower slewing axis—permits movements and/or position changes by deformations of the axis of rotation of the tower. The consideration of the movability of the machine structure as a consequence of structural deformations under load or dynamic loads is important especially in elongated slender and structures that are deliberately exploited in regard to the static and dynamic boundary conditions—under consideration of the required safety—such as in cranes, since in this case, recognizable movement components, for example for the crane operator's cab, but also the load hook position are added by the deformations of the structural components. In order to enable an actually realistic training here, the movement simulation module accounts for such deformations under static and dynamic loads.

In particular, the determination device may comprise a calculation unit for the determination of such structural deformation, which calculates these structural changes based upon a stored calculation scheme depending on the control station. Such a model can be structured similarly to a finite element model or be a finite element model, wherein advantageously, however, a model which is simplified compared with a finite element model is used, which can be determined empirically, for example, by the detection of structural deformations under certain control commands and/or load conditions at the real crane or the real machine. Such a calculation model may operate with tables, in which certain deformations are assigned to certain control commands, wherein interim values of the control commands can be translated into corresponding deformations by means of an interpolation device.

The use of such a computation scheme, which is simplified in comparison to a finite element model, permits a faster determination of the structural deformations and thus a more realistic simulation of machine movements in real time or almost real time under less computation power.

The structural component deformations considered by the movement simulation model can, on the one hand, be considered in the control of the drive device for moving the control station, so that the control station simulates the control station movements occurring due to the structural deformations. Alternatively or additionally, the determined structural component deformations can be considered also in the calculation of the virtual representation of the machine surroundings and/or the machine components visible therein, for example in such a way that the bending of the boom is illustrated in the virtual representation, or the horizon of the crane surroundings is moved a bit upwards, in order to simulate a slight forward pitching of the crane operator's cab due to a tower deformation, for example.

According to a further aspect, it is proposed to simulate crane or machine reactions to control commands input at the control station not only in the form of a virtual representation on the display device, but also in an actual movement of the control station along with the crane or machine reaction, in order to get the dynamic machine reactions across to the user of the simulator in a more realistic manner. The control station, which may include an operator chair, for example, is no longer static in space, or mounted on the ground, but moveable in space by a drive device.

In particular, the control station is moveably mounted and can be moved by a drive device depending on the movement determined by the movement simulation module and/or deformation of the machine components. In the event that the movement simulation module determines deflections of machine components such as the crane tower due to actuations or deformations, which would influence the position of the real crane operator's cab, the drive device is correspondingly controlled by a drive control device to simulate the movement of the crane operator's cab and move the control station correspondingly. If, for example, a command for turning the crane about the vertical axis is input at the control station, the control station is turned correspondingly about the vertical axis by the drive device. If, for example, a control command for the lifting of a heavy load is input, which in reality may lead to a slight forward pitching of the crane structure, the control station is displaced slightly forward and/or slightly tilted forward.

To enable a most realistic simulation of the control station movements occurring in real operation, the drive device can be formed to be moveable along multiple axes and perform both rotary and translator movements. In particular, the control station can be mounted in a manner to be moveable along multiple axes, and the control station may include at least one vertical axis of rotation and at least one horizontal pitching axis and/or two horizontally oriented translator axes. To be able to simulate complex control station movements as well, the drive device may comprise three rotary and pivoting axes, or be configured to be operating in a three-axially rotational manner and be configured to be operating in a three-axially translational manner, so that the control station can be rotated or tilted about all three spatial axes and be displaced in all three spatial directions. Depending on the crane type or machine type to be simulated, simpler configurations of the drive device with fewer axes of motion can also be considered.

In order to further increase the reality feeling of the user of the simulator, according to a further aspect, it is provided that the virtual representations provided by the graphical simulation module from the simulation world are superimposed with live images from the control station, which may, for example, show movements of the user of the simulator. In particular, the virtual representations of the machine surroundings generated by the graphical simulation module and/or the machine components visible therein on the one hand, and live images of a live camera captured at the control station on the other hand, can be represented on the display device simultaneously and in a superimposed manner. Such a superposition of images from the simulation world and live images provides the user of the simulator with a particular strong feeling of reality.

Advantageously, to that end, a display device wearable on the head, in particular in the type of glasses, can be used as a display device, for example in the form of virtual reality glasses, and a camera, which is advantageously also wearable on the head, for example formed as a helmet camera or integrated in the virtual reality glasses, can be used, which provides the mentioned live images, which are displayed on the display device, in particular the virtual reality glasses, together with the artificially generated virtual representation.

The mentioned camera for the provision of the live images can advantageously be a stereoscopic camera, which provides stereoscopic images preferably in the camera viewing direction which at least approximately equals the viewing direction of the eye pair of a user, which can be faded-in at a corresponding location of the display device, in particular the virtual reality glasses. As a result, a particularly strong reality feeling of the user can be achieved.

Basically, however, it would also be possible to superimpose images from the simulation world and the mentioned live images on a per se conventional screen, wherein a user, for example, could wear a live image camera on the head which provides images at least approximately corresponding to the viewing direction of the user, so that a live captured user arm or the live-captured part of the control station can be faded-in on the display device for example in the form of multiple screen. However, a more realistic and thus more impressive simulation can be achieved by superimposition on the visual surfaces of virtual reality glasses, however.

The superimposition device for superimposing the live images of the camera with the virtual representation from the graphical simulation module can advantageously be operating according to the "green screen technique", wherein the superimposition device recognizes color surfaces of a certain color in the live image and replaces these image areas with the virtual representation from the simulation module. To that end, advantageously, the control station may include an operator's cab wall, in which window areas—for example corresponding to the inspection windows of a real crane operator's cab—are colored in a key color, which differs from the remaining colors of the remaining components located in the camera's field of vision, such as the color of the window frame, the input means and the operator clothes as well as skin color of the operator in a most clear manner, so that the live image captured in the control station shows the mentioned colored surfaces in a certain color representation, while all of the other image surfaces are shown in other colors. The live image surfaces or sub-surfaces colored in the mentioned key color—for example green—will then be replaced with the virtual representation of the machine surroundings and/or the visible machine components, so that the superimposed image or the superimposed representation shows the control station of the simulator, its components and body parts of the user situated in the field of vision of the live camera in real as a live image on the one hand, and on the other hand the virtual representation of the machine surroundings and the machine components visible therein in the window areas of the operator's cab wall captured by the live camera.

The mentioned virtual representation of the machine surroundings can advantageously be changed by the graphical simulation module and be adapted to different scenarios depending on different data sets, which can be imported into the simulation module via an interface. In particular, planning data such as CAD data of a building to be constructed and/or construction site data, which, depending on the construction progress, show the actual state of the constructed building, can be imported into the simulation module via a corresponding data interface and be used by the simulation module to generate the virtual representation of the machine surroundings according to the imported data set, in particular depending on the imported planning data and/or actual data of the construction site, or adapt it thereto.

Linking the graphical simulation module with construction site or building information allows using the simulator in a targeted manner for the training of the works to be done for a certain building or a certain construction site. If, for example, a complicated crane lifting movement is to be performed, which is to maneuver a load past various obstacles and must place a load in a zone of the building that is not visible, this can be trained at the simulator repetitively.

The mentioned construction or building information can be CAD data or other geometrical data of the building or of the construction site, wherein possibly also image data can be used, which represent the actual building and its construction progress. Such image data can be imported into the graphical simulation module as data of the machine surroundings via the mentioned CAD interface or a suitable image data interface, which module will thereupon adapt the virtual representation to the received CAD and/or image data.

Modeling a planned or already existing or partially performed construction site and the corresponding generation of the virtual representation of the machine surroundings by the graphical simulation module is, in particular, also a valuable aid to ensure logistics at the construction site and be able to simulate and train critical processes even before the start of construction.

In a further development of the invention, provision can be made for the use of the simulator as a remote controller for the remote-controlling of a "real" crane, construction machine or industrial truck, wherein advantageously, a communication link can be provided between the crane, the construction machine and/or the industrial truck on the one hand, and the simulator on the other hand, via which link control commands input at the control station of the simulator can be transmitted to the control device of the crane, the construction machine and/or the industrial truck. The "real" crane or the respectively remote-controlled "real" device performs the control commands input at the control station of the simulator, and at the same time, the virtual representation of the crane surroundings and the crane components visible therein generated by the simulator shows how the crane implements the control commands. Here, it may be provided to feed the movement parameters and sensor signals detected at the real crane back to the simulator and to use them there for generating the virtual representation of the crane surroundings in order to ensure that actually a representation corresponding to the actual crane surroundings and position is being displayed on the display device of the simulator.

Independently of the mentioned option of use as a remote control station, the invention will hereinafter be explained in greater detail by means of a preferred exemplary embodiments and associated drawings.

DETAIL DESCRIPTION OF THE INVENTION

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways.

As used in the specification and the appended Claims, the singular forms "a," "an" and "the" include plural references unless the context clearly dictates otherwise. For example, reference to a component is intended also to include a composition of a plurality of components. References to a composition containing "a" constituent is intended to include other constituents in addition to the one named.

In describing exemplary embodiments, terminology will be resorted to for the sake of clarity. It is intended that each term contemplates its broadest meaning as understood by those skilled in the art and includes all technical equivalents that operate in a similar manner to accomplish a similar purpose.

Ranges may be expressed as from "about" or "approximately" or "substantially" one value and/or to "about" or "approximately" or "substantially" another value. When such a range is expressed, other exemplary embodiments include from the one value and/or to the other value.

Similarly, as used herein, "substantially free" of something, or "substantially pure", and like characterizations, can include both being "at least substantially free" of something, or "at least substantially pure", and being "completely free" of something, or "completely pure".

"Comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

The characteristics described as defining the various elements of the invention are intended to be illustrative and not restrictive. For example, if the characteristic is a material, the material includes many suitable materials that would perform the same or a similar function as the material(s) described herein are intended to be embraced within the scope of the invention. Such other materials not described herein can include, but are not limited to, for example, materials that are developed after the time of the development of the invention.

Figure 1:
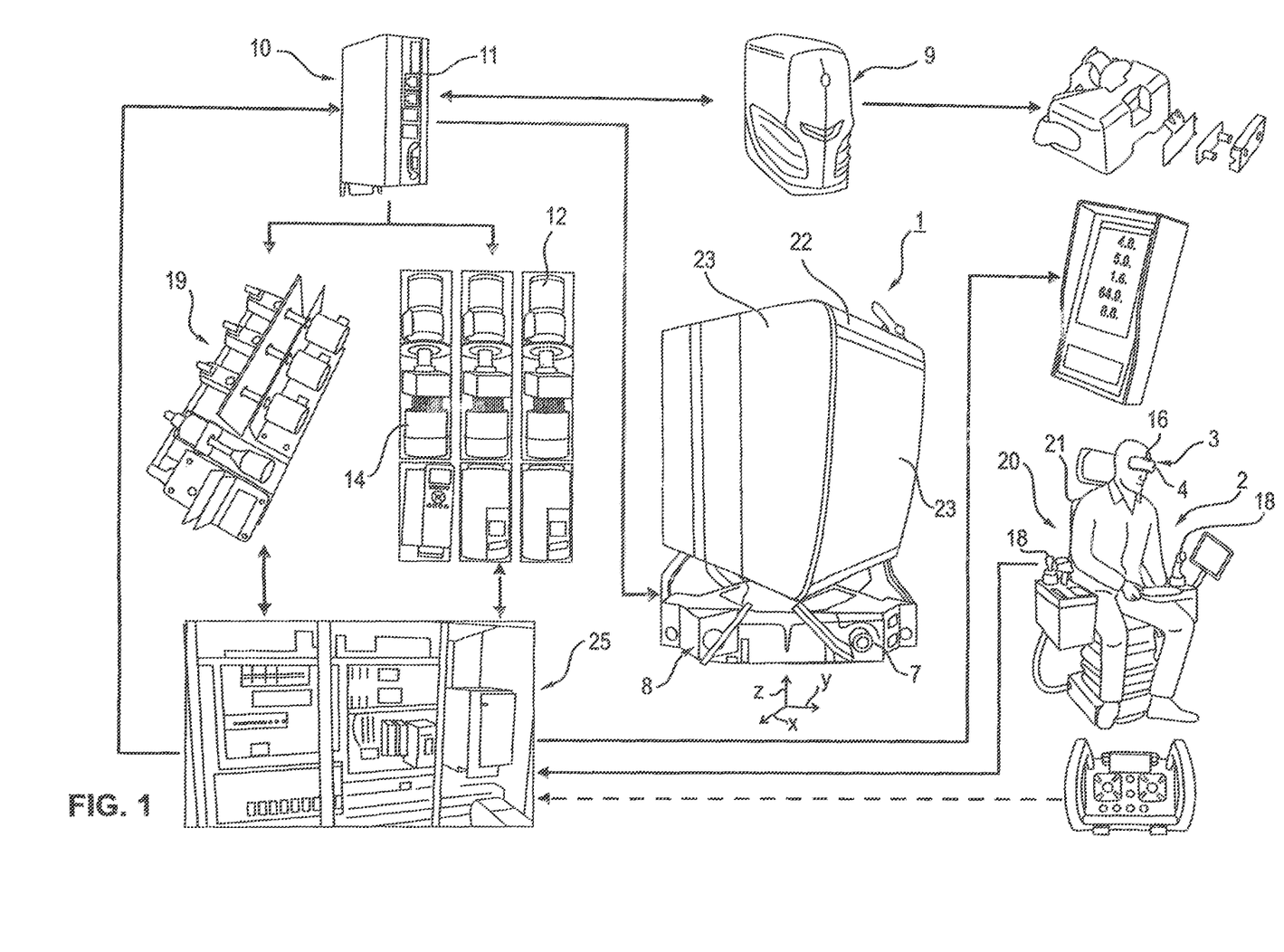
FIG. 1 is a schematic representation of the components of a crane simulator according to an advantageous embodiment of the invention.

As shown in FIG. 1, the simulator 1 can be configured as a crane simulator, which includes a control station 2 in the form of a crane operator's cab, which essentially corresponds to a "real" crane operator's cab that can be used in a crane, for example a tower slewing crane, a dockside crane, or a maritime crane, or a mobile telescopic crane.

The mentioned control station 2 can include, in a manner known per se, an operator seat 21, e.g. in the form of an operator chair 20, around which several input means 18 for inputting control commands are arranged. The mentioned input means 18 can, for example, comprises a joystick, a touchscreen, a control lever, input buttons and witches, rotary controllers, shift controllers, etc.

The operator's location is surrounded by a wall 22 of the operator's cab, which can correspond to a cab housing and may comprises window regions 23, which, in real crane operator's cabs, are made of glass, but in the present case are colored in a certain color, for example coated with a green foil, in order to be able to fade-in a virtual machine surroundings using green-screen technique, as will be explained later.

The control station 2 is mounted on a movement platform 7, by means of which the control station 2 can be moved along multiple axes. Here, advantageously, the movement platform is formed to be moveable along multiple axes, in particular tiltable or rotatable along all three spatial axes x, y, and z and translatory displaceable along these axes.

Here, the movement axes x, y and z of the movement platform 7 are assigned to actuators of a drive apparatus 8, for example in the form or electric motors and/or hydraulic cylinders and/or hydraulic motors, in order to be able to move the control station 2 around or along the mentioned axes.

Here, the drive apparatus 8 is controlled by a movement control device 24, which can be realized by an industrial personal computer (IPC).

The mentioned movement control device 24 can in particular be part of a movement simulation module 10, by means of which crane movements and/or positions and/or orientations of crane components such as of the boom or the tower and also twists of structural components such as the boom or job or the tower can be determined depending on the respective control commands input at the control station 2. The mentioned movement simulation module 10 determines, so to say, the effects of the input control commands on the crane to be simulated, i.e. which movements, positions, orientations and twists of the crane components would result on the crane to be simulated due to the input control commands, and outputs corresponding characterizing movement signals characterizing the mentioned values.

The mentioned movement simulation module 10 determined the the movement values not or not completely by computation based upon a calculation scheme, but uses actual hardware components in the form of drive and control components, which perform actual movements and simulate the corresponding hardware components at a real crane.

Figure 2:
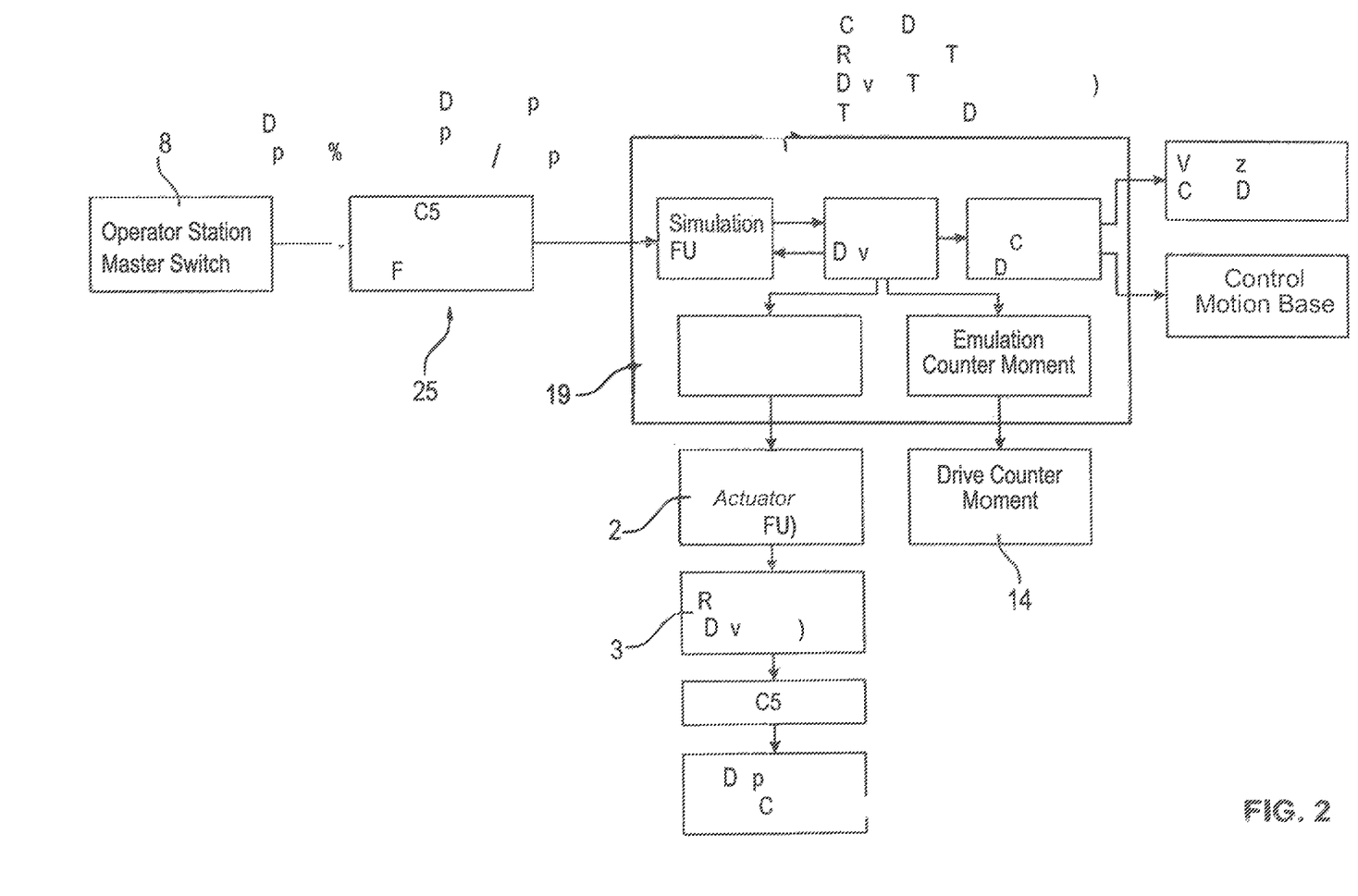
FIG. 2 is a schematic representation of the hardware components for the data emulation of the movement simulation module.
Figure 3:
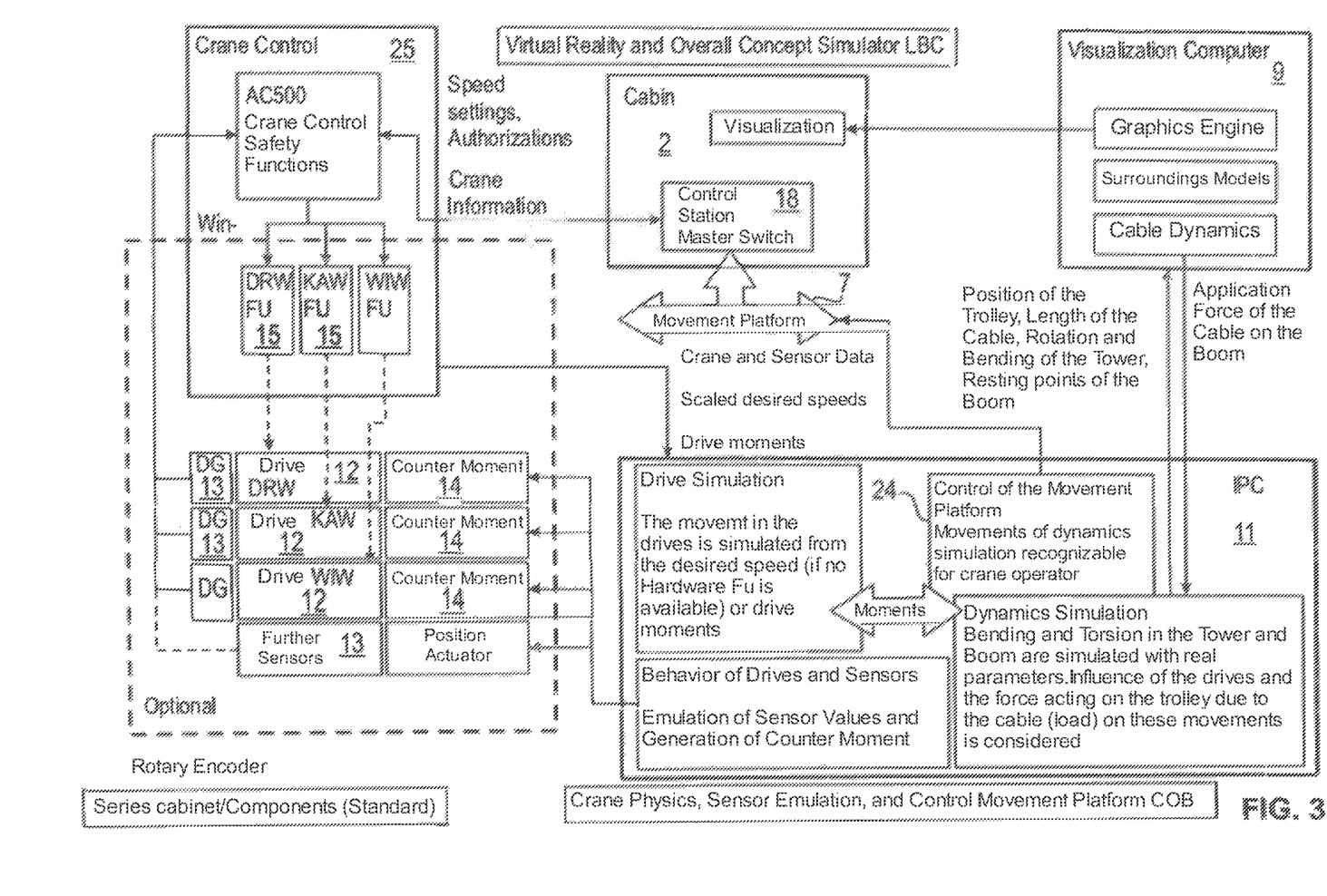
FIG. 3 is a schematic representation, in the type of a circuit diagram, of the overall concept of the simulator from the preceding FIGS. 1-2 and the functional interaction of the components thereof.

As shown by FIGS. 2 and 3 in greater detail, the movement simulation module 10 includes the essential components of a crane control 25, just like can be realized in the control cabinet of a crane. In particular, this crane control 25 includes the frequency converter 15 of different crane drives, for example of the rotary mechanism, the trolley drive, and the lifting unit. The mentioned crane control 25 may possibly include further control and/or power electronics components, in particular load monitoring components, components in regard to the areas of limited operability, etc.

The crane control 25 is connected to the control station 2 and the input means 18 thereof in a communicating manner, so that the crane control 25 can further process the input control commands, wherein in particular the frequency converters 15 control drive units 12, for example in the form of servo drives, depending in the input control commands. The control commands input at the control station 2 are thus translated into real movements or driving moments and forces of the drive units 12.

The mentioned drive units 12 can be coupled with counter drive units 14 here, by means of which movements resistance can be added to the drive units 12, in order to be able to simulate real resistance such as lifting loads, wind power, inertia, od dynamic loads. These counter drive units 14 can be controlled by the above-mentioned IPC, which also realizes the movement control device 24. Here, the control of the counter drive units 24 can be affected based upon several presets or programs, for example through predefined lifting loads, predefined wind programs, or by means of predetermined functions or tables with dynamic reactions when decelerating the trolley or the rotary movement. To that end, corresponding modes, tables, or functions can be stored in a storage module of the controller for the control of the counter drive units 14.

As shown in FIGS. 2 and 3, the drive units 12 are assigned detection devices 13, for example in the form or rotary encoders or other position and/or movement sensors, by means of which movement or position signals can be provided, which characterize the actuations of the drive units 12. Thus, the movement simulation module 10 provides real sensor signals as movement parameters, which on the one hand can be displayed at the control station 2, and on the other hand can also be used for further simulation functions. In particular, depending on the mentioned movement signals, that the rotary encoders provide, structural twists such as tower bending, boom or jib bending, and similar deformations can be determined based upon a calculation scheme, and the device 8 of the movement platform 7 can be controlled to move the control station 2, and the virtual representation of the crane surroundings can be generated, in each case dependent upon the mentioned sensors signals generated in reality.

As shown in FIG. 3, the movement simulation module 10 may include a computation unit 11, which in turn can be realized by the above mentioned IPC, by means of which computation unit 11, depending on the control commands input at the control station 2 and/or the emulated data, the sensor signals generated by the data emulation apparatus 113 or the detection device 13 assigned to the drive units 12 can be generated, structural changes are determined, in particular bending or torsion in the tower crane and in the boom or jib, wherein the computation unit 11 uses a calculation scheme considering structural rigidity, as explained above.

Based upon the mentioned emulated movement data as well as the deformation data determined therefrom, the movement control device 24 controls the drive device 8 of the movement platform 7 in order to move the control station 2 and simulate real movements of the crane operator's cab, which would occur when inputting corresponding control commands in a real crane.

On the other hand, the mentioned movement data and, as the case may be, also the mentioned deformation data is used to consider crane reactions in a virtual representation, which is generated by a graphical simulation module 9 and displayed on a display device 3. This virtual representation particularly shows the crane surroundings as well as crane components visible therein, such as the boom, or the load hook, and may essentially correspond to the image seen by the crane operator when looking out of the window. The mentioned virtual representation may correspond to the pixel representation in multiple colors in the form of a photo or film-like digital image, for example. However, as an alternative, a simplified graphical representation can be provided, although a most realistic, photo- or film-like representation image is preferred.

Advantageously, the mentioned virtual representation of the crane surroundings and the crane components visible therein are superimposed with a live image, which shown real components from the control station 2, in particular components such as input means 18, the hands or the forearm if the user and other components located in the field of view from the head of the user of the simulator in the viewing direction.

Advantageously, a camera 16 is provided to that end, which can be formed as a head camera worn on the head of the user, and which may comprise corresponding attachment and/or holding means for attaching it on the head, for example in the form of a helmet camera. In the case that the display device 3 is formed, advantageously, in the form of virtual reality glasses 4, worn by the user, the camera 16 can be integrated in these VR glasses.

Advantageously, the camera 16 is formed as a stereoscopic camera, in order to be able to provide stereoscopic images corresponding to the viewing axes of the two eyes of the user.

The superimposition device 17 for superimposing the virtual representation of the crane surroundings generated by the graphical simulation module 9 with the lie image of the camera 16 can in particular include a color-based image processing module 26, which can operate in accordance with the green screen technique. In particular, the mentioned color-based image processing module 26 can recognize image regions within the live image of the camera 16, which have a certain color deviating from the remaining image sub-surfaces, and the replace these image regions by the virtual representation from the simulation module 9.

To that end, advantageously, the control station 2 can include an operator's cab wall 22, in which window regions 23—for example corresponding to the inspection windows of a real operator's cab—are colored in a key color, which most significantly differs from the remaining colors of the remaining components situated in the field of vision of the camera, such as the color of the window frame, the input means 18 and the clothes and skin color of the operator, so that the live image captured in the control station 2 shows the mentioned colored surfaces in a certain color representation, while all other image surfaces are shown in other colors. The live image surfaces or sub-surfaces colored in the mentioned key color—for example green—are then replaced with the virtual representation of the machine surroundings and/or the machine components visible therein, which is generated by the graphical simulation module 9, so that the superimposed image or the superimposed representation, on the one hand, shows the control station 2 of the simulator, the components thereof and body parts of the user situated in the field of vision of the camera as a live image in reality, and, on the other hand, shows the virtual representation of the machine surroundings and the machine components visible therein in the window regions 23 of the operator's cab wall 22 captured by the live camera 16.

The mentioned virtual representation of the machine surroundings can advantageously be changed by the graphical simulation module 9 and be adapted to various scenarios depending on different data sets, which can be imported via an interface into the simulation module. In particular, planning data such as CAD data of a building to be constructed and/or actual data of the construction site and/or image data, which show the actual state of the constructed building depending on the progress of construction, can be imported into the simulation module 9 via a corresponding data interface, for example a CAD interface and/or an image data interface, and be used by the simulation module 9 to generate the virtual representation of the machine surroundings in accordance with the imported data set, in particular dependent upon the imported planning data and/or actual data of the construction site, or adapt it thereto.

The invention claimed is:

1. A simulator for a machine comprising:
    a movement simulation module for determining movements and/or deformations of machine components depending on entered control commands;
    a control station comprising:
        an input means for entering control commands;
        a graphical simulation module configured to generate a virtual representation of a machine environment and/or machine components visible from the control station; and
        a display device for displaying the virtual representation; and
    a drive apparatus;
    wherein the control station is moveably mounted to the drive apparatus for moving the control station depending on the movements and/or deformations determined by the movement simulation module;

wherein the movement simulation module comprises a data emulation apparatus for emulating movement data of the machine to be simulated;

wherein the data emulation apparatus comprises:
an actuator component for performing an actuator movement depending on an entered control command;
a first drive unit configured to perform actuator movements depending on control commands entered at the control station; and
a detection device configured to:
detect movements of the first drive unit; and
provide a movement and/or position signal;

wherein the movement simulation module further comprises a second drive unit coupled with the first drive unit, the second drive unit configured to exert a counter moment and/or a counter load in order to simulate actually occurring loads, resistances or inertia;

wherein the movement simulation module is configured to determine movements and/or deformations of machine components depending on at least a portion of the entered control commands; and wherein the graphical simulation module is configured to generate the virtual representation:
based upon the determined movements and/or deformations from the movement simulation module; and
under consideration of a performed actuator movement.

2. The simulator according to claim 1, wherein the movement simulation module further comprises a power control component for controlling the first drive unit.

3. The simulator according to claim 2, wherein the movement simulation module further comprises a control cabinet and/or a control unit, which corresponds to a control cabinet and/or a control unit of the machine being simulated or is emulated corresponding to the same.

4. The simulator according to claim 1, wherein the control station is mounted to be moveable along multiple axes; and
wherein the drive apparatus comprises multiple movement axes (x, y, z) which can be actuated depending on control commands entered at the control station.

5. The simulator according to claim 1 further comprising a movement platform;
wherein the control station is mounted on the movement platform, into which the drive apparatus is integrated.

6. The simulator according to claim 1, wherein the movement simulation module further comprises a determination device for determining deformations of structural components of the machine being simulated depending on the control commands entered at the control station; and
wherein the determination device comprises a computing unit for calculating the deformations based upon a stored deformation model of the structural components.

7. The simulator according to claim 6, wherein the graphical simulation module is further configured to generate the virtual representation depending on the calculated deformations of the structural components and/or a control device is provided for controlling the drive apparatus depending on the calculated deformations of the structural components.

8. The simulator according to claim 1 further comprising a camera for capturing a live image at the control station;
wherein the display device is assigned a superimposition device which is provided to superimpose the virtual representation generated by the graphical simulation module with the live image provided by the camera on the display device.

9. The simulator according to claim 8, wherein the camera comprises a head holder for carrying the camera at the head of a user of the simulator and/or is formed as a head camera and/or helmet camera.

10. The simulator according to claim 8, wherein the camera is formed as a stereoscopic camera for the provision of stereoscopic images at least approximately in the viewing direction of a user of the simulator.

11. The simulator according to claim 1, wherein the display device comprises a head holder to be carried on the head of a user of the simulator and/or is formed as virtual reality glasses with a camera integrated therein.

12. The simulator according to claim 8, wherein the control station includes an operator's cab wall, in which inspection windows are formed;
wherein the inspection windows are colored; and
wherein the graphical simulation module and/or the superimposition device comprises a color-sensitive fade-in unit for fading-in the virtual representation in image surfaces of the live image provided by the camera, which are colored in the same color as the inspection windows.

13. The simulator according to claim 1, wherein the graphical simulation module comprises:
a data interface for importing data of a building and/or construction site; and
an image processing device for generating and/or adjusting the virtual representation of the machine surroundings depending on the imported data of the building and/or construction site.

14. The simulator according to claim 13, wherein the data interface is one or both of:
a CAD interface and the image processing device is configured to generate and/or adjust the virtual representation of the machine surroundings depending on the imported data through the CAD interface; and
an image data interface and the image processing device is configured to generate and/or adjust the virtual representation of the machine surroundings depending on the preferably digital image data imported via the image data interface.

15. A method for the remote-control of a machine comprising:
providing the simulator according to claim 1; and
remotely controlling an operation of the machine with the simulator.

16. A system comprising:
the simulator according to claim 1;
a machine; and
a communication link provided between the machine and the simulator;
wherein control commands entered at the control station of the simulator can be transmitted to a control device of the machine.

17. A simulator for a machine comprising:
a movement simulation module configured to determine movements and/or deformations of machine components depending on entered control commands;
a control station comprising:
an operator's cab wall in which colored inspection windows are formed;
a graphical simulation module configured to generate a virtual representation of a machine environment and/or machine components visible from the control station; and
a display device for displaying the virtual representation; and a camera for capturing a live image at the control station;
wherein the display device is assigned a superimposition device configured to superimpose on the display device the virtual representation with the live image; and
wherein the graphical simulation module and/or the superimposition device comprises a color-sensitive fade-in unit for fading-in the virtual representation in image surfaces of the live image provided by the camera, which are colored in the same color as the inspection windows.

18. The simulator according to claim 17, wherein the movement simulation module comprises a data emulation apparatus configured to emulate movement data of the machine to be simulated; and
wherein the data emulation apparatus comprises an actuator component configured to perform an actuator movement depending on an entered control command.

19. The simulator according to claim 18, wherein the control station further comprises an input means for entering control commands;
wherein the graphical simulation module is configured to generate the virtual representation:
based upon the determined movements and/or deformations from the movement simulation module; and
under consideration of a performed actuator movement; and
wherein the data emulation apparatus further comprises:
a first drive unit configured to perform actuator movements depending on control commands entered at the control station; and
a detection device configured to:
detect movements of the first drive unit; and
provide a movement and/or position signal.

20. The simulator according to claim 19, wherein the movement simulation module further comprises a second drive unit coupled with the first drive unit, the second drive unit configured to exert a counter moment and/or a counter load in order to simulate actually occurring loads, resistances or inertia.

* * * * *